United States Patent [19]

Umino

[11] Patent Number: 4,697,319
[45] Date of Patent: Oct. 6, 1987

[54] APPARATUS FOR ATTACHING BOXES TO SLIDE FASTENERS WITH SEPARABLE BOX AND PIN OF SYNTHETIC RESIN

[75] Inventor: Mitsugu Umino, Uozu, Japan
[73] Assignee: Yoshida Kogyo K. K., Tokyo, Japan
[21] Appl. No.: 902,112
[22] Filed: Aug. 29, 1986

Related U.S. Application Data

[63] Continuation of Ser. No. 734,613, May 16, 1985.

[30] Foreign Application Priority Data

May 18, 1984 [JP] Japan ................... 59-99827

[51] Int. Cl.⁴ .................. A41H 37/06; B29D 5/00; B23Q 7/10
[52] U.S. Cl. .................... 29/33.2; 29/767; 29/809; 221/298
[58] Field of Search .......... 29/33.2, 408–410, 29/766–769, 809; 221/298

[56] References Cited

U.S. PATENT DOCUMENTS

| | | | |
|---|---|---|---|
| 2,916,125 | 12/1959 | Wallberg | 221/298 |
| 3,714,698 | 2/1973 | Fukori | 29/408 |
| 3,789,487 | 2/1974 | Kawakami | 29/768 X |
| 4,309,233 | 1/1982 | Akashi | 29/410 X |
| 4,361,946 | 12/1982 | Takamatsu | 29/766 X |
| 4,494,293 | 1/1985 | Kawakami | 29/33.2 X |

FOREIGN PATENT DOCUMENTS

| | | | |
|---|---|---|---|
| 509964 | 2/1955 | Canada | 221/298 |
| 924660 | 10/1955 | Fed. Rep. of Germany | 221/298 |
| 53-69746 | 6/1978 | Japan . | |
| 55-91303 | 7/1980 | Japan . | |
| 2041074 | 9/1980 | United Kingdom | 29/409 |
| 2042062 | 9/1980 | United Kingdom | 29/766 |
| 2071204 | 9/1981 | United Kingdom | 29/767 |

*Primary Examiner*—Gil Weidenfeld
*Assistant Examiner*—Steven C. Bishop
*Attorney, Agent, or Firm*—Hill, Van Santen, Steadman & Simpson

[57] ABSTRACT

A box holder swingably mounted on a frame is angularly movable between a box receiving position and a box attaching position. The box holder has a casing, an anvil slidably disposed in the casing, and a pair of gripping jaws angularly movably disposed in the casing for gripping the box therebetween against an end of the anvil. A first fluid cylinder is disposed on the frame for pressing the anvil in the box attaching position. An ultrasonic horn mounted for movement toward and away from the box holder is pressed by a second fluid cylinder toward the anvil holder in the box attaching position to grip the box between the end of the anvil and the ultrasonic horn. While the box is gripped between the anvil and the ultrasonic horn, the ultrasonic horn is energized to apply ultrasonic vibrations to weld the box to the box pin inserted therein.

2 Claims, 12 Drawing Figures

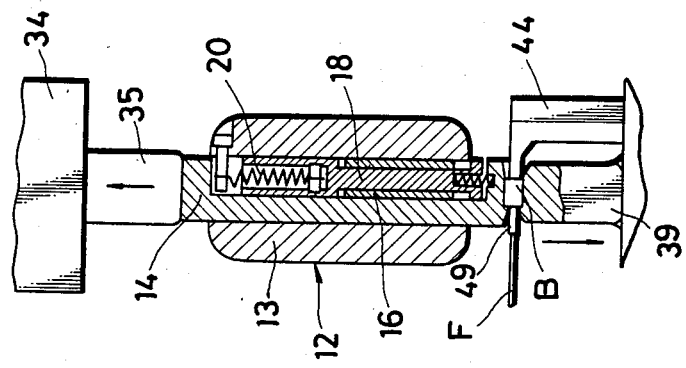
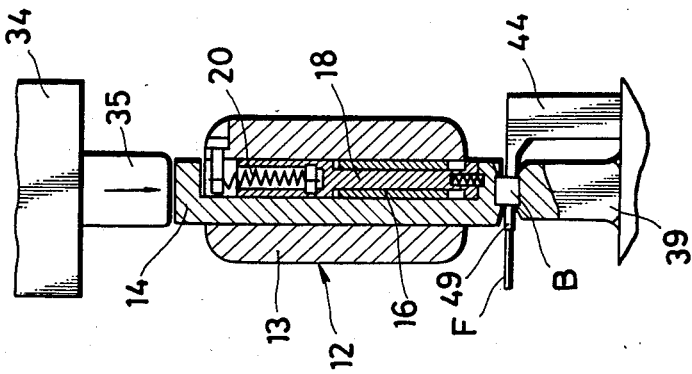
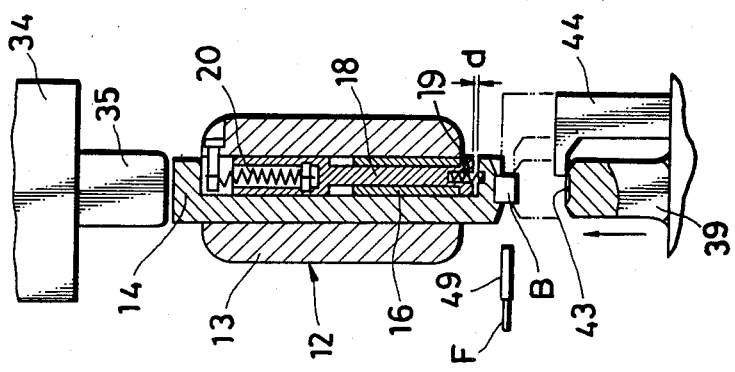

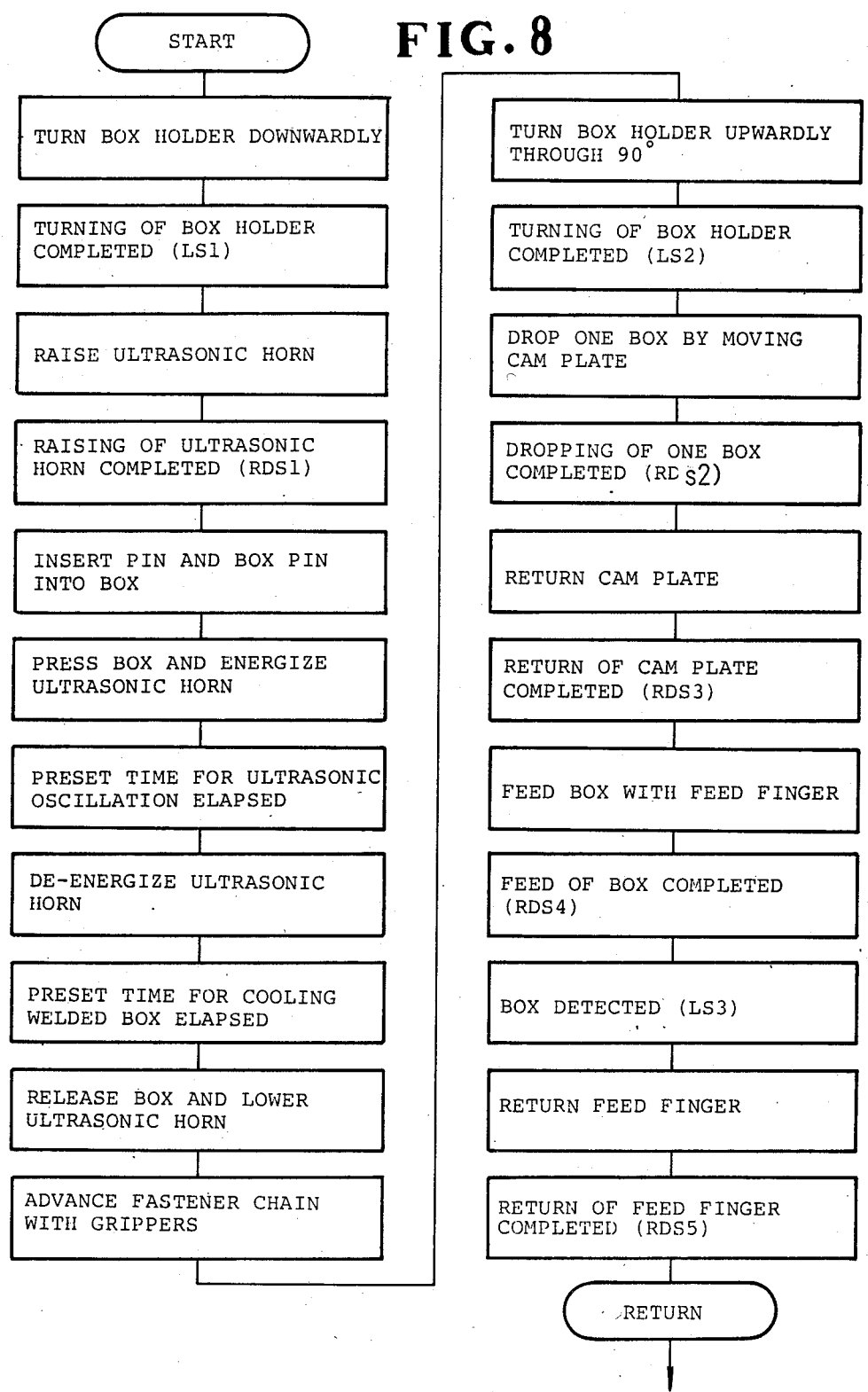

APPARATUS FOR ATTACHING BOXES TO SLIDE FASTENERS WITH SEPARABLE BOX AND PIN OF SYNTHETIC RESIN

This is a continuation of application Ser. No. 734,613, filed May 16, 1985.

BACKGROUND OF THE INVENTION

1. Field of the Invention

The present invention relates to an apparatus for attaching a box of synthetic resin to a box pin of synthetic resin in the process of manufacturing a slide fastener having a separable box and pin on an end thereof.

2. Prior Art

There are known apparatus for manufacturing slide fasteners with separable box and pin of synthetic resin. One such apparatus of typical design is disclosed in Japanese Laid-Open Patent Publication No. 55-91303 published on Jul. 10, 1980. According to the disclosed apparatus, a slider is threaded over one of a pair of uncoupled slide fastener stringers, and then a separable box and pin device of synthetic resin is infection-molded on ends of the slide fastener stringers. The slide fastener stringers are cut off to a predetermined length, which is discharged as a final slide fastener product. Since the fastener stringers of the final product are separated, they must be manually coupled together before the slide fastener is packaged.

Japanese Laid-Open Patent Publication No. 53-69746 published on Jun. 21, 1978 reveals a method of manufacturing slide fasteners with separable box and pin. This method comprises the steps of attaching a pin and a box pin respectively to slide fastener stringers cut to a given length, threading a slider over the slide fastener stringers to couple them, attaching a box to the box pin to produce a slide fastener, pulling up the slider to close the slide fastener, and then discharing the slide fastener for packaging. However, no box attachment apparatus has heretofore been available for use in automatically the above manufacturing method.

SUMMARY OF THE INVENTION

It is an object of the present invention to provide an apparatus for attaching boxes of synthetic resin to separable slide fastener stringers, the apparatus being simple in construction, efficient in operation, and designed for automating a process of manufacturing slide fastener stringers having a separable box and pin of synthetic resin, thus producing completed slide fastener products in which sliders are mounted and the slide fastener stringers are coupled together.

According to the present invention, an apparatus for attaching a box of synthetic resin to a box pin of synthetic resin on an end of a slide fastener chain includes a box holder swingably mounted on a frame and angularly movable between a box receiving position and a box attaching position, the box holder having a casing, an anvil slidably disposed in the casing, and a pair of gripping jaws angularly movably disposed in the casing for gripping the box therebetween against an end of the anvil, a first means for pressing the anvil in the box attaching position, and an ultrasonic horn mounted for movement toward and away from the box holder, and a second means for pressing the ultrasonic horn toward the anvil holder in the box attaching position to grip the box between the end of the anvil and the ultrasonic horn.

Many other advantages and features of the present invention will become manifest to those versed in the art upon making reference to the detailed description and the accompanying sheets of drawings in which a preferred structural embodiment incorporating the principles of the present invention is shown by way of illustrative example.

BRIEF DESCRIPTION OF THE DRAWINGS

FIGS. 5A through 5C are enlarged vertical cross-sectional views of the box holder, showing successive steps of attaching a box to the slide fastener chain;

FIG. 8 is a flowchart of operation of the box attachment apparatus.

DETAILED DESCRIPTION

Figure 1:
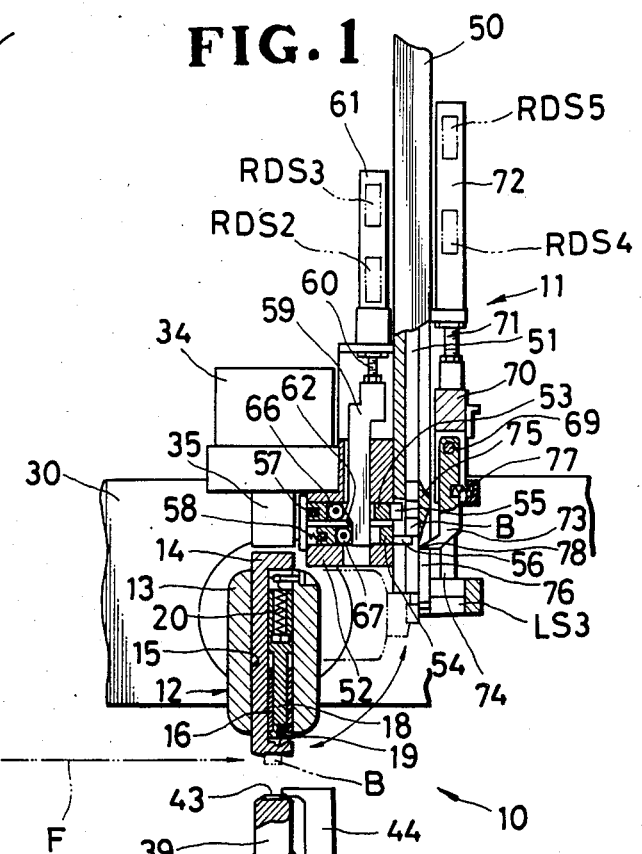
FIG. 1 is a vertical cross-sectional view, partly in elevation, of a box attachment apparatus according to the present invention, the box attachment apparatus being combined with a box feed mechanism.
Figure 2:
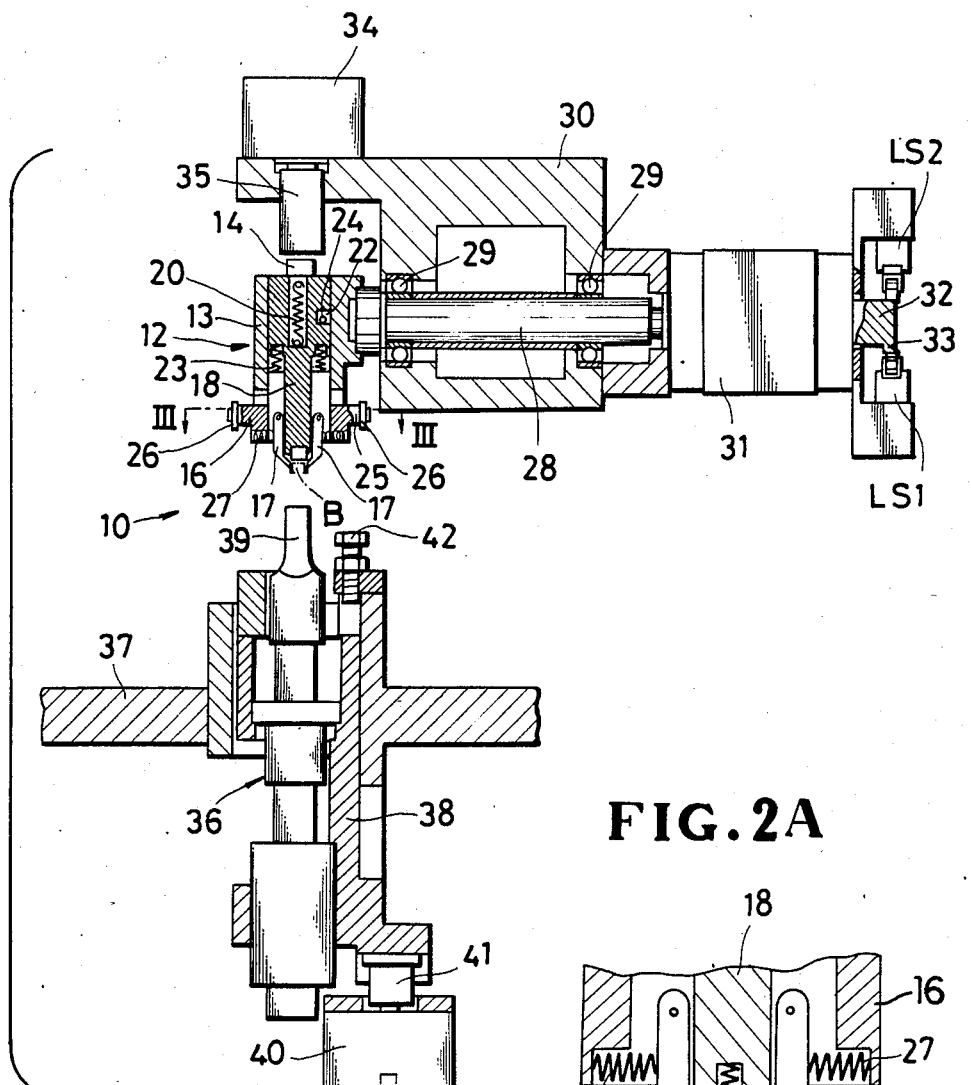
FIG. 2 is a vertical cross-sectional view, partly in elevation, of the box attachment apparatus shown in FIG. 1.

The principles of the present invention are particularly useful when embodied in a box attachment apparatus, generally designated by the reference numeral 10 in FIGS. 1 and 2.

As shown in FIG. 1, the box attachment apparatus 10 is combined with a box feed mechanism 11. The box attachment apparatus 10 has a swingable box holder 12 composed of a casing 13 accommodating an anvil 14 slidably in a slot 15 defined in the casing 13, the anvil 14 having a substantially C-shaped cross section. The anvil 14 holds therein a slide block 16 having a pair of gripping jaws 17 (FIG. 2) for gripping a box B against the lower end of the anvil 14, and a guide plate 18 for guiding vertical movement of the slide block 16. A compression spring 19 is interposed between the lower end of the guide plate 18 and the anvil 14 for normally urging the anvil 14 to move downwardly. A tension spring 20 is connected between the casing 13 and the upper end of the guide plate 18 for normally urging the guide plate 18 to move downwardly.

Figure 2A:
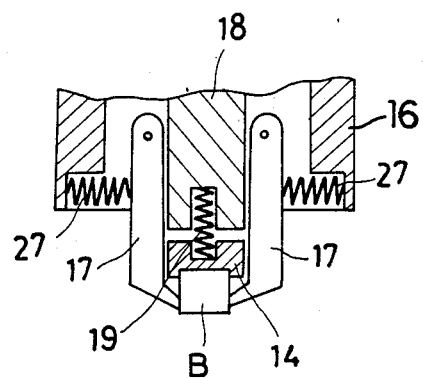
FIG. 2A is an enlarged fragmentary cross-sectional view of a box holder in the box attachment apparatus.
Figure 3:
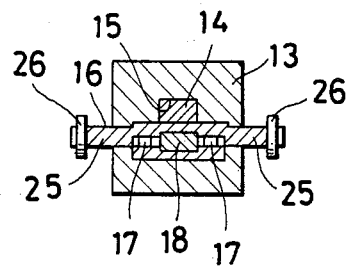
FIG. 3 is a cross-sectional view taken along line III—III of FIG. 2.

As illustrated in FIG. 2, the guide plate 18 has a recess 22 defined therein and receiving a stop pin 24 projecting from the casing 13. The stop pin 24 serves to limit the vertical movement of the guide plate 18 to a certain interval. The slide block 16 is normally urged to move downwardly in the position of FIG. 2 by a pair of compression springs 23 acting between the slide block 16 and the guide plate 18. The slide block 16 has a pair of laterally projecting arms 25 each supporting a roller 26 respectively thereon as shown in FIGS. 2 and 3. As better shown in FIG. 2A, the gripping jaws 17 are normally urged toward each other by a pair of compression springs 27 acting between the gripping jaws 17 and the slide block 16. When the rollers 26 are engaged by a pair of grippers 86 (FIG. 4) which grip and feed a slide fastener chain F, the slide block 16 is moved upwardly against the forces of the springs 23. The gripping jaws 17 are also moved upwardly into engagement with the lower end of the anvil 14, whereupon the gripping jaws 17 are forced apart from each other against the biasing forces of the springs 27, thereby releasing the box B.

As shown in FIG. 2, the box holder 12 is coupled to an end of a rotatable shaft 28 for angular movement about its own axis through an angle of 90°. The rotatable shaft 28 is rotatably supported by a pair of bearings 29 in a frame 30. The other end of the rotatable shaft 28 is coupled to a rotary actuator 31 having a shaft 32 with a pair of cam projections 33, 33 (only one shown) on a peripheral surface of its end, the two cam projections 33, 33 being angularly spaced at an angle of 90°. Two limit switches LS1, LS2 are disposed in angularly spaced relation adjacent to the shaft end of the rotary actuator 31. The limit switches LS1, LS2 engage the cam projections 33, 33 to control the shaft 28 and hence the box holder 12 to turn between an upper box receiving position and a lower box attaching position which is 90° spaced therefrom. The frame 30 supports thereon a fluid cylinder 34 having a piston rod 35 for pressing the upper end of the anvil 14 to force downwardly the box B supported on its lower end.

As shown in FIGS. 1 and 2, an ultrasonic transducer 36 supported on a holder 38 is vertically movably mounted on a frame 37 fixed with respect to the frame 30, the ultrasonic transducer 36 having an ultrasonic horn 39 on its upper end for applying ultrasonic vibrations to the box B. A fluid cylinder 40 has a piston rod 41 fixed to the lower end of the holder 38 for vertically moving the ultrasonic transducer 36. Upward movement of the ultrasonic transducer 36 is sensed by a reed switch RDS1 associated with the fluid cylinder 40 and is limited by a stop 42 mounted adjustably on the frame 37. As shown in FIGS. 1 and 5, the ultrasonic horn 39 has on its upper end a recess 43 for receiving the box B, and the holder 38 has a box support 44 disposed behind the recess 43 for holding the box B as received in the recess 43.

As shown in FIG. 1, the box feed mechanism 11 supplies one box B at a time to the box holder 12 which has been angularly moved to the upper box receiving position. The box feed mechanism 11 includes a chute 50 having a guide groove 51 defined therein for storing a succession of boxes B. The box feed mechanism 11 also has a block 52 supporting a pair of upper and lower pressers 53, 54 disposed laterally slidably therein and having an abutment 55 and a retainer pin 56, respectively. The upper and lower pressers 53, 54 are normally urged by respective compression springs 57, 58 in a direction to move the abutment 55 and the retainer pin 56 toward the guide groove 51. The lowermost box B is prevented from dropping off the chute 51 by engagement with the retainer pin 56 projecting into the guide groove 51. The abutment 55 serves to be pressed against the next box B following the lowermost box B to hold the next box B while the lowermost box B is being delivered from the chute 51 to the box holder 12.

Figure 1A:
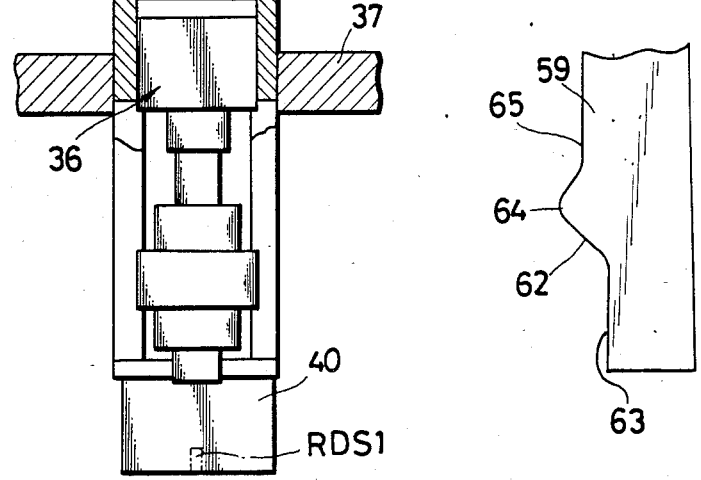
FIG. 1A is an enlarged fragmentary side elevational view of a cam plate in the box attachment apparatus.

A cam plate 59 is slidably disposed in a block 52 and extends across the pressers 53, 54. The cam plate 59 is mounted at one end thereof on a piston rod 60 of a fluid cylinder 61 disposed vertically on one side of the chute 50. As illustrated in FIG. 1A, the cam plate 59 has a slanted cam surface 62 blending into a front flat cam surface 63 toward the lower end of the cam plate 59. The cam plate 59 also has a highest cam surface 64 contiguous to the slanted cam surface 62 remotely from the front flat cam surface 63, the highest cam surface 64 blending into a rear flat cam surface 65 in a direction away from the lower end of the cam plate 59. The cam surfaces 62 through 65 are held in engagement with a pair of rollers 66, 67 rotatably mounted in the pressers 53, 54, respectively. When the cam plate 59 is lowered by the fluid cylinder 61, the roller 67 rolls from the front flat cam surface 63 onto the slanted cam surface 62 to move the lower presser 54 to the left (FIG. 1), thus retracting the retainer pin 56 out of the guide groove 51. The lowermost box B is then allowed to drop down the guide groove 51. At this time, the box holder 12 lies horizontally in the upper box receiving position in which the box B discharged from the chute 50 is received between the gripping jaws 17. Simultaneously, the roller 66 rolls off the highest cam surface 64 onto the rear flat cam surface 65 to enable the upper presser 53 to move to the right under the force of the compression spring 57. The abutment 55 of the upper presser 53 is then held against the next box B which is prevented from dropping down the guide groove 51. When the cam plate 59 is raised by the fluid cylinder 61, the roller 67 moves from the slanted cam surface 62 onto the front flat cam surface 63 to cause the retainer pin 56 to be displaced into the guide groove 51. The roller 66 rolls from the rear flat cam surface 65 onto the highest cam surface 64, whereupon the abutment 55 is released from the next box B, which drops down the guide groove 51 until it is stopped by the retainer pin 56. Therefore, the boxes B are allowed to drop, one at a time, down the guide groove 51 through alternate lateral sliding movement of the pressers 53, 54 in response to vertical movement of the cam plate 59. Lower and upper limits of the vertical movement of the cam plate 59 are detected by a pair of reed switches RDS2, RDS3, respectively, associated with the fluid cylinder 61.

A feed finger holder 70 is mounted on a piston rod 71 of a fluid cylinder 72 disposed vertically on the other side of the chute 50. A feed finger 73 is angularly movably mounted by a pin 69 on the feed finger holder 70, which is vertically movable along a guide rail 74. The chute 50 includes a partition 75 vertically extending between the guide groove 51 and the guide rail 74 and having a slot 76 defined in the partition 75 and extending downwardly below the retainer pin 56 in communication with the guide groove 51. The feed finger 73 is normally biased by a spring 77 to turn toward the partition 75. When the feed finger holder 70 is lowered down the guide rail 74 by the fluid cylinder 72, the feed finger 73 is moved downwardly to allow its tip end 78 to project through the slot 76 into the guide groove 51 under the force of the compression sping 77. As the feed finger 73 is progressively lowered, the tip end 78 thereof pushes the discharged box B downwardly until the gripping jaws 17 are inserted into respective slots B3 (FIG. 6) defined in opposite sides of the box B. Therefore, the box B is securely retained by the gripping jaws 17. Thereafter, the feed finger holder 70 is lifted by the fluid cylinder 72 to retract the tip end 78 of the feed finger 73 out of the guide groove 51 through the slot 76 onto the partition 75. Lower and upper limits of the vertical movement of the feed finger holder 70 are detected by reed switches RDS4, RDS5, respectively, associated with the fluid cylinder 72. The guide rail 74 supports on its lower end a limit switch LS3 for detecting the box B which has been pushed downwardly by the feed finger 73.

Figure 4:
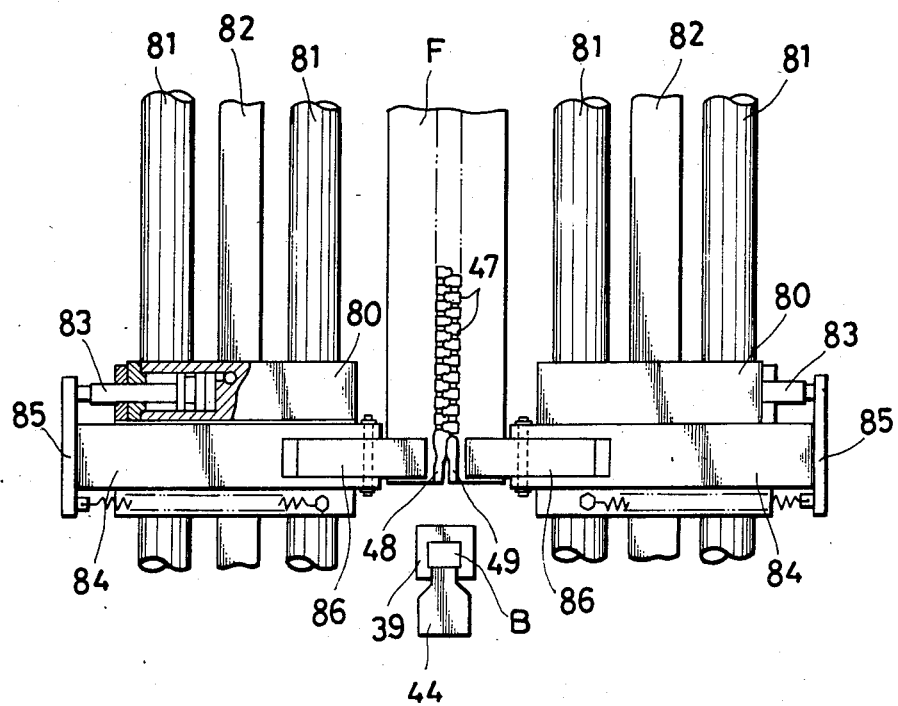
FIG. 4 is a plan view of a gripper mechanism for gripping and feeding a slide fastener chain.

FIG. 4 shows a gripper mechanism for gripping and feeding the slide fastener chain F. The gripper mechanism includes a pair of bases 80, 80 slidably mounted on two pair of guide rails 81 and driven by belts 82, 82 to move along the guide rails 81. The bases 80, 80 contain fluid cylinder piston rods 83, 83 each coupled to a slide plate 84, by a connector plate 85. A gripper 86, is mounted respectively on each of the slide plates 83; each gripper 86 is normally open and is closable to grip the slide fastener chain F.

Figure 6:
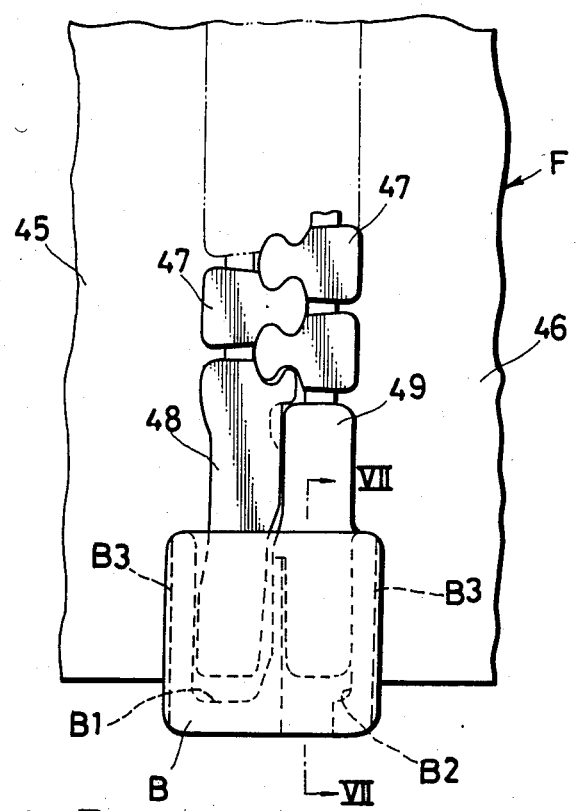
FIG. 6 is an enlarged fragmentary plan view of the slide fastener chain with the box attached thereto.

As shown in FIGS. 4 and 6, the slide fastener chain F includes a pair of slide fastener stringer tapes 45, 46 supporting on their confronting longitudinal edges a pair of intermeshing rows of coupling elements 47 of synthetic resin, which are coupled together by a slider (not shown) slidably mounted theron. A pin 48 and a box pin 49 of synthetic resin are injection-molded on the stringer tapes 45, 46, respectively, at ends thereof.

Figure 7:
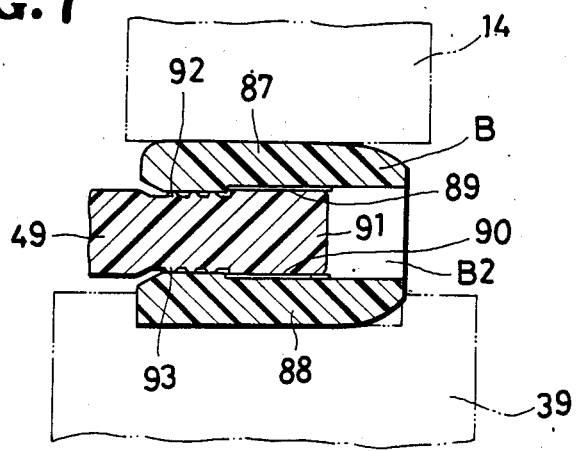
FIG. 7 is a cross-sectional view taken along line VII—VII of FIG. 6, showing the box before having been melded with the box pin.

As shown in FIG. 6, the box B is made of synthetic resin and has a pair of cavities B1, B2 defined therein. The pin 48 is removably inserted in the cavity B1, while the box pin 49 is securely inserted in the cavity B2 and ultrasonically welded to the box B. As illustrated in FIG. 7, the box B is composed of upper and lower walls 87, 88 having longitudinal ridges 89, 90, respectively, projecting into the cavity B2 for engagement with an end portion 91 of the box pin 49. The box pin 49 has transverse ridges 92, 93 disposed on its upper and lower surfaces adjacent to the end portion 91 for engagement with the upper and lower walls 87, 88 of the box B. These ridges 89, 90, 92, 93 serve as an ultrasonic energy director for welding the box B to the box pin 49 efficiently.

Operation of the box attachment device 10 combined with the box feed mechanism 11 will be described also with reference to FIGS. 5A through 5C and 8.

The box holder 12 with the box B supported by the gripping jaws 17 is turned downwardly to the lower box attaching position (FIG. 1), and is stopped in this position when the limit switch LS1 is actuated. Then, the ultrasonic horn 39 is raised to receive the box B in its recess 43 and grip the box B between the ultrasonic horn 39 and the anvil 14. The upward movement of the ultrasonic horn 39 is completed when the reed switch RDS1 is actuated. The grippers 86 are moved along the guide rails 81 to insert the pin 48 and the box pin 49 respectively into the cavities B1, B2 in the box B as shown in FIG. 6, during which time the rear end of the box B is held by the support 44. The fluid cylinder 34 is actuated to lower the piston rod 35 for thereby enabling the anvil 14 to press the box B against the ultrasonic horn 39, which is energized to apply an ultrasonic energy to the box B. The box B is now ultrasonically welded to the box pin 49.

More specifically, as shown in FIG. 5A, the box B is gripped between the lower end of the anvil 14 and the recessed upper end of the ultrasonic horn 39 prior to insertion of the box pin 49 into the box B. At this time, there is a small clearance gap d between the anvil 14 and the lower end of the guide plate 18 under the force of the compression spring 19. The clearance gap d is provided to take up a slight upward displacement of the anvil 14 caused by upward movement of the upper wall 87 of the box B due to the ridges 89, 90, 92, 93 upon insertion of the box pin 49 into the box B. In FIG. 5B, the pin 48 and the box pin 49 are inserted into the box B with the anvil 14 raised by the upper wall 87 of the box B, eliminating the clearance gap d. The rollers 26 are engaged and lifted by the grippers 86 to move the slide block 16 upwardly along the guide plate 18. The gripping jaws 17 are forced apart from each other by engagement with the lower end of the anvil 14, thereby releasing the box B. The fluid cylinder 34 is actuated to lower the piston rod 35 to press the anvil 14 against the box B. Simultaneously, the ultrasonic horn 39 is energized to weld the box B to the box pin 49 by melting the ridges 89, 90, 92, 93. At this time, the guide plate 18 is slightly lowered against the force of the tension spring 20 to increase the depth by which the welded surfaces of the box B and the box pin 49 are brought together, thus increasing the bonding strength of the box B and the box pin 49. After a preset time for ultrasonic oscillation has elapsed, the ultrasonic horn 39 is de-energized. Since the ridges 89, 90, 92, 93 are melted and disappear, the upper and lower walls 87, 88 become spaced a normal distance from each other. After a preset time for cooling the welded box B has elapsed, the piston rod 35 is lifted to release the anvil 14 with the guide plate 18 returned upwardly under the force of the tension spring 20, and the ultrasonic horn 39 is lowered. The box B is now unlocked, and the slide fastener chain F with the box B attached is fed again by the grippers 86 and discharged as a completed separable slide fastener.

The box holder 12 is turned 90° upwardly to the upper box receiving position. The limit switch LS2 is actuated by the cam projection 33 to hold the box holder 12 in the upper box receiving position. Then, the fluid cylinder 61 is actuated to move the cam plate 59, releasing one box B to drop onto the gripping jaws 17. Such releasing of the box B is detected by the reed switch RDS2. The cam plate 59 is returned upwardly, the returning of the cam plate 59 being detected by the reed switch RDS3. The fluid cylinder 72 is then actuated to enable the feed finger 73 to push and feed the box B into secure engagement by the gripping jaws 17. The movement of the feed finger 73, and hence the feeding of the box B, is detected by the reed switch RDS4. The feed finger 73 is returned upwardly, and the returning thereof is detected by the reed switch RDS5. The box B which has been pushed by the feed finger 73 is detected by the limit switch LS3. When the box B is supplied to the box holder 1, the box holder 1 is turned 90° downwardly to the box attaching position in readiness for a next box attachment cycle.

The box attachment apparatus 10 and the box feed mechanism 11 can be automatically operated according to the sequence of FIG. 8 under the control of an electric control circuit which processes signals issued from the limit switches LS1 through LS3 and the reed switches RDS1 through RDS5. Alternatively, a microcomputer may be programmed to implement the sequential steps shown in FIG. 8.

Although various minor modifications may be suggested by those versed in the art, it should be understood that we wish to embody within the scope of the patent warranted hereon, all such embodiments as reasonably and properly come within the scope of our contribution to the art.

What is claimed is:

1. An apparatus for attaching a box of synthetic resin to a box pin on an end of a slide fastener chain, comprising:
   (a) a frame;

(b) a box feed mechanism supported on said frame, and having a chute for storing a succession of boxes;

(c) a box holder swingably mounted on said frame, and angularly movable between a box receiving position in registration with said chute, and a box attaching position, said box holder having a casing, a slide block slidably disposed in said casing, an anvil slidably disposed in said casing, a pair of gripping jaws pivotally mounted on said slide block and angularly movably disposed in said casing for gripping the box therebetween against an end of said anvil, a guide plate mounted in said casing for guiding sliding movement of said slide block, said slide block having a pair of arms extending away from each other, and a pair of springs acting between said arms and said gripping jaws for normally urging said gripping jaws toward each other;

(d) first means for pressing said anvil in said box attaching position and providing spring-biased clearance permitting lateral insertion of an over-sized box-expanding pin into said box;

(e) an ultrasonic horn mounted for movement toward and away from said box holder and said anvil (f) second means for pressing said ultrasonic horn toward said anvil holder in said box attaching position to grip the box between said end of said anvil and said ultrasonic horn.

2. An apparatus according to claim 1, said box feed mechanism including:

a block on said frame; a pair of power-actuated upper and lower pressers laterally slidable in said block, said upper presser having an abutment, and said lower presser having a retainer pin; spring means acting on said pressers and urging said abutment and said retainer pin toward a groove in said chute; said retainer pin projecting into said groove and retaining the lowermost box and said abutment pressing against the box following the lowermost box to hold it while the lowermost box is being delivered from said chute to said box holder.

* * * * *